United States Patent
Nagasaka (10) Patent No.: US 12,090,797 B2
(45) Date of Patent: Sep. 17, 2024

(54) WHEEL FOR VEHICLE

(71) Applicant: CENTRAL MOTOR WHEEL CO., LTD., Anjo (JP)

(72) Inventor: Masahiro Nagasaka, Anjo (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 295 days.

(21) Appl. No.: 17/713,336

(22) Filed: Apr. 5, 2022

(65) Prior Publication Data

US 2022/0371383 A1    Nov. 24, 2022

(30) Foreign Application Priority Data

May 18, 2021    (JP) .................................. 2021-083564

(51) Int. Cl.
*B60C 19/00*    (2006.01)
*B60B 21/12*    (2006.01)

(52) U.S. Cl.
CPC ............ *B60C 19/002* (2013.01); *B60B 21/12* (2013.01); *B60B 2900/133* (2013.01)

(58) Field of Classification Search
CPC ............................... B60C 19/002; B60B 21/12
See application file for complete search history.

(56) References Cited

U.S. PATENT DOCUMENTS

| | | | | |
|---|---|---|---|---|
| 4,896,921 A * | 1/1990 | Sato | ......................... | B60C 23/16 |
| | | | | 301/5.1 |
| 7,152,643 B2 * | 12/2006 | Morinaga | ................. | B60B 3/02 |
| | | | | 301/6.91 |
| 9,333,552 B2 * | 5/2016 | Furukawa | ............. | B60B 21/104 |
| 10,131,184 B2 * | 11/2018 | Mohan | ..................... | B60B 25/22 |
| 10,504,500 B2 * | 12/2019 | Kamiyama | .......... | G10K 11/172 |
| 10,723,435 B2 * | 7/2020 | Madjlesi | ................. | B64C 11/00 |
| 11,548,328 B2 * | 1/2023 | Nishi | .................... | B60C 19/002 |
| 11,557,273 B2 * | 1/2023 | Kamiyama | ............. | B60B 21/12 |
| 2012/0273302 A1 | 11/2012 | Takagaki et al. | | |
| 2013/0239411 A1 | 9/2013 | Furukawa et al. | | |
| 2016/0059624 A1 | 3/2016 | Mohan et al. | | |
| 2017/0120673 A1 | 5/2017 | Kamiyama | | |
| 2018/0082670 A1 | 3/2018 | Kamiyama | | |
| 2018/0148158 A1 | 5/2018 | Madjlest | | |

FOREIGN PATENT DOCUMENTS

| | | |
|---|---|---|
| JP | H09-044167 A | 2/1997 |
| JP | 2012-77838 A | 4/2012 |
| JP | 2015-081034 A | 4/2015 |
| WO | 2011/080793 A1 | 7/2011 |
| WO | 2012/114470 A1 | 8/2012 |
| WO | 2015/137370 A1 | 9/2015 |
| WO | 2016/147878 A1 | 9/2016 |

* cited by examiner

*Primary Examiner* — Forrest M Phillips
*Assistant Examiner* — Joseph James Peter Illicete
(74) *Attorney, Agent, or Firm* — Oliff PLC (57) ABSTRACT

A wheel for a vehicle includes a plurality of Helmholtz resonators each including an auxiliary air chamber communicating with a tire air chamber through a communication hole. The Helmholtz resonators include one or more first Helmholtz resonators set to have a silencing characteristic for a first-order resonance frequency of air column resonance noise in the tire air chamber, and one or more second Helmholtz resonators set to have a silencing characteristic for a second-order or higher-order resonance frequency of the air column resonance noise.

7 Claims, 3 Drawing Sheets

WHEEL FOR VEHICLE

CROSS-REFERENCE TO RELATED APPLICATION

This application claims priority to Japanese Patent Application No. 2021-083564 filed on May 18, 2021, incorporated herein by reference in its entirety.

BACKGROUND

1. Technical Field

The present disclosure relates to a wheel for a vehicle.

2. Description of Related Art

There is widely known a wheel for a vehicle including a Helmholtz resonator having an auxiliary air chamber that communicates with a tire air chamber through a communication hole to reduce road noise generated when the vehicle is traveling (see, for example, WO 2015/137370).

SUMMARY

The wheel for the vehicle described in WO 2015/137370 includes a Helmholtz resonator set to have a silencing characteristic for a first-order resonance frequency of air column resonance noise in the tire air chamber or a resonance frequency close to the first-order resonance frequency. As a result, the air column resonance noise at the first-order resonance frequency that is generated in the tire air chamber is removed while the vehicle is traveling, thereby reducing road noise generated when the vehicle is traveling.

However, the air column resonance noise in the tire air chamber actually includes not only the resonance noise at the first-order resonance frequency but also resonance noise at a second-order or higher-order resonance frequency. In the wheel for the vehicle described in WO 2015/137370, the air column resonance noise at the first-order resonance frequency that is generated in the tire air chamber is removed while the vehicle is traveling, but the air column resonance noise at the second-order or higher-order resonance frequency that is generated in the tire air chamber cannot be removed. Therefore, the Helmholtz resonator does not have a sufficient silencing action for the air column resonance noise in the tire air chamber. There is a demand to further improve the silencing action of the Helmholtz resonator for the air column resonance noise in the tire air chamber.

The present disclosure provides a wheel for a vehicle including the Helmholtz resonator that further improves its silencing action for the air column resonance noise in the tire air chamber.

A wheel for a vehicle according to an aspect of the present disclosure includes a plurality of Helmholtz resonators each including an auxiliary air chamber communicating with a tire air chamber through a communication hole.

In the aspect described above, the Helmholtz resonators include one or more first Helmholtz resonators set to have a silencing characteristic for a first-order resonance frequency of air column resonance noise in the tire air chamber, and one or more second Helmholtz resonators set to have a silencing characteristic for a second-order or higher-order resonance frequency of the air column resonance noise.

The Helmholtz resonators are preferably arrayed along a circumferential direction of the wheel (without overlapping each other in the circumferential direction of the wheel) at different positions in the circumferential direction of the wheel, but may be arrayed along an axial direction of the wheel and overlap each other in the circumferential direction of the wheel.

Thus, the one or more first Helmholtz resonators can remove the air column resonance noise at the first-order resonance frequency that is generated in the tire air chamber, and the one or more second Helmholtz resonators can also remove the air column resonance noise at the second-order or higher-order resonance frequency that is generated in the tire air chamber. As compared with the wheel for the vehicle described in WO 2015/137370, the silencing actions of the Helmholtz resonators for the air column resonance noise in the tire air chamber are increased at least by the amount corresponding to the removal of the air column resonance noise at the second-order or higher-order resonance frequency.

In the aspect described above, assuming that the number of the Helmholtz resonators having a silencing characteristic for an a-th order resonance frequency (a is a natural number) of the air column resonance noise is b (b is a natural number equal to or larger than 2), one of the b communication holes of the b Helmholtz resonators is a reference communication hole, (b−1) natural numbers c equal to or larger than 2 and equal to or smaller than b are assigned to the (b−1) communication holes other than the reference communication hole in a one-to-one relationship, and n is any natural number, an angle z (in units of degree) between the reference communication hole and each of the (b−1) communication holes other than the reference communication hole from the reference communication hole to one side in a circumferential direction of the wheel may be a value expressed by $z=-180(c-1)/ab+180n/a$.

According to studies conducted by the inventors, when the arrangement in the circumferential direction of the wheel for the b communication holes of the b Helmholtz resonators having the silencing characteristic for the a-th order resonance frequency is the arrangement specified above, it is possible to minimize variation in the silencing effect of the Helmholtz resonators for the air column resonance noise at the a-th order resonance frequency (details will be described later).

In the aspect described above, the Helmholtz resonators may be arrayed along a circumferential direction of the wheel at different positions in the circumferential direction of the wheel. A length of the auxiliary air chamber of the second Helmholtz resonator in the circumferential direction of the wheel may be set smaller than a length of the auxiliary air chamber of the first Helmholtz resonator in the circumferential direction of the wheel. A plurality of partition walls that separates the Helmholtz resonators in the circumferential direction of the wheel may be arrayed along the circumferential direction of the wheel to have line symmetry across a line segment corresponding to a diameter and passing through a rotation axis of the wheel. A valve hole for mounting a valve configured to supply air to the tire air chamber may be positioned on the line segment in the circumferential direction of the wheel.

Accordingly, the partition walls having mass are arranged to have the line symmetry across the line segment corresponding to the diameter, and the valve having mass and mounted in the valve hole is positioned on the line segment corresponding to the diameter in the circumferential direction of the wheel. Therefore, a weight balance can be made uniform between a region on one side of the line segment corresponding to the diameter in the circumferential direction of the wheel and a region on the other side of the line segment corresponding to the diameter in the circumferential direction of the wheel. Since the length of the auxiliary air chamber of the second Helmholtz resonator in the circumferential direction of the wheel is set smaller than the length of the auxiliary air chamber of the first Helmholtz resonator in the circumferential direction of the wheel, the weight of the wheel for the vehicle can be reduced as compared with, for example, a case where the lengths of the auxiliary air chambers of the first and second Helmholtz resonators in the circumferential direction of the wheel are equal and the volume of the auxiliary air chamber of the second Helmholtz resonator is reduced.

In the structure described above, the second Helmholtz resonators may include one or more second Helmholtz resonators set to have a silencing characteristic for a resonance frequency equal to a highest-order resonance frequency and positioned to face the valve hole across the rotation axis in the circumferential direction of the wheel.

As the order of the resonance frequency of the air column resonance noise generated in the tire air chamber increases, the circumferential length of the Helmholtz resonator having the silencing characteristic for the resonance noise decreases, and the circumferential distance between the two partition walls defining the Helmholtz resonator in the circumferential direction of the wheel decreases. When the one or more second Helmholtz resonators having the silencing characteristic for the highest-order resonance frequency are positioned to face the valve hole across the rotation axis as in the structure described above, the region facing the valve hole in the circumferential direction of the wheel includes more partition walls having mass than in the region including the valve hole in the circumferential direction of the wheel. As a result, in this wheel for the vehicle, the region facing the valve hole in the circumferential direction of the wheel tends to be heavier than the region including the valve hole in the circumferential direction of the wheel. In this respect, according to the structure described above, the valve having mass is arranged on the valve hole side in the circumferential direction of the wheel (=relatively light side) while being arranged in the valve hole (that is, in the use of the wheel for the vehicle). Thus, the weight balance between the region facing the valve hole in the circumferential direction of the wheel and the region including the valve hole in the circumferential direction of the wheel approaches a uniform balance.

In the aspect described above, the wheel for the vehicle may include a plurality of hollows arrayed along the circumferential direction of the wheel inside a wheel rim of the wheel for the vehicle at different positions in the circumferential direction of the wheel, a plurality of partition walls that is provided on the wheel rim of the wheel for the vehicle and separates the hollows adjacent to each other in the circumferential direction of the wheel, and a plurality of through holes that is provided in the wheel rim of the wheel for the vehicle and communicates the hollows with the tire air chamber. The hollows may function as the auxiliary air chambers. The through holes may function as the communication holes. The hollows and the through holes in the hollows may constitute the Helmholtz resonators.

Accordingly, the wheel for the vehicle according to the present disclosure can be realized, for example, without separately providing a plurality of resin Helmholtz resonators (auxiliary air chamber members) to the wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a wheel 10 for a vehicle according to an embodiment of the present disclosure will be described with reference to FIG. 1. The wheel 10 for the vehicle is preferably made of an aluminum alloy, but may be made of steel or resin. A wheel disc and a wheel rim constituting the wheel 10 for the vehicle may be integrated together or provided separately.

Figure 1:
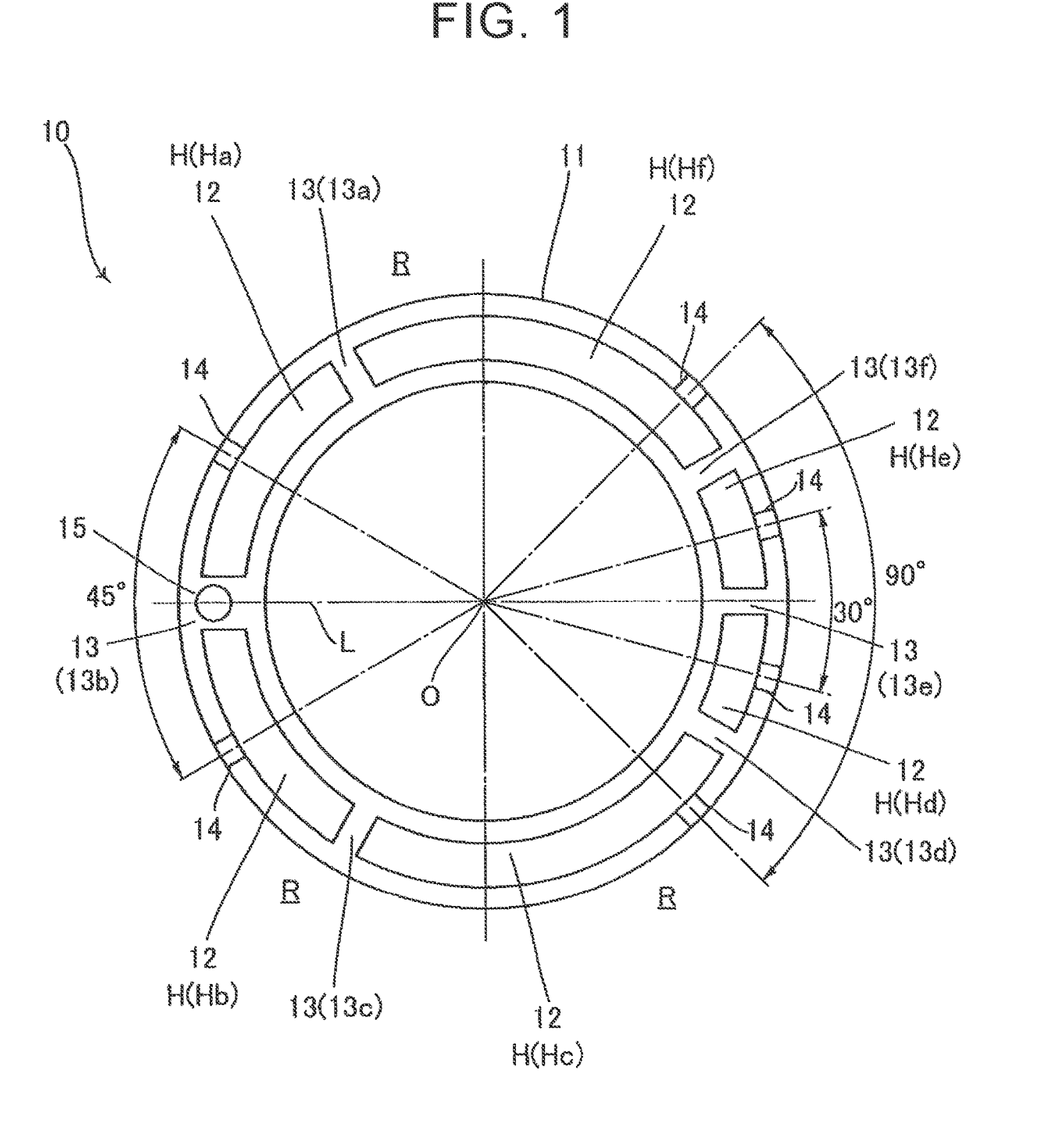
FIG. 1 is a sectional view schematically showing a wheel for a vehicle according to an embodiment of the present disclosure.

As shown in FIG. 1, the wheel 10 for the vehicle includes a plurality of (specifically, six) hollows 12 arrayed along a wheel circumferential direction (without overlapping each other in the wheel circumferential direction) inside a wheel rim 11 at different positions in the wheel circumferential direction. The six hollows 12 are separated from each other in the circumferential direction by a plurality of (specifically, six) partition walls 13, thereby defining spaces independent of each other. Each of the hollows 12 has a through hole 14 communicating with a tire air chamber R.

The hollows 12, the partition walls 13, and the through holes 14 are integrated in the wheel rim 11. Such a structure can be realized by, for example, a manufacturing method described in WO 2012/114470. The partition walls 13 may be members (for example, resin or rubber members) provided separately from the wheel rim 11.

The hollows 12 and the through holes 14 in the hollows 12 constitute a plurality of (specifically, six) Helmholtz resonators H. That is, the hollow 12 functions as an auxiliary air chamber 12 of the Helmholtz resonator H, and the through hole 14 functions as a communication hole 14 of the Helmholtz resonator H. Thus, the wheel 10 for the vehicle includes the six Helmholtz resonators H integrated in the wheel rim 11.

For convenience of explanation, as shown in FIG. 1, the six partition walls 13 are hereinafter distinguished as "partition walls 13a, 13b, 13c, 13d, 13e, and 13f", and the six Helmholtz resonators H are hereinafter distinguished as "Helmholtz resonators Ha, Hb, Hc, Hd, He, and Hf".

The Helmholtz resonator Ha is defined by the partition walls 13a and 13b adjacent in the wheel circumferential direction. The Helmholtz resonator Hb is defined by the partition walls 13b and 13c adjacent in the wheel circumferential direction. The Helmholtz resonator Hc is defined by the partition walls 13c and 13d adjacent in the wheel circumferential direction. The Helmholtz resonator Hd is defined by the partition walls 13d and 13e adjacent in the wheel circumferential direction. The Helmholtz resonator He is defined by the partition walls 13e and 13f adjacent in the wheel circumferential direction. The Helmholtz resonator Hf is defined by the partition walls 13f and 13a adjacent in the wheel circumferential direction.

In the wheel 10 for the vehicle, each of the two Helmholtz resonators Hc and Hf is set to have a silencing characteristic for a first-order resonance frequency to remove air column resonance noise at the first-order resonance frequency that is generated in the tire air chamber R. Each of the two Helmholtz resonators Ha and Hb is set to have a silencing characteristic for a second-order resonance frequency to remove air column resonance noise at the second-order resonance frequency that is generated in the tire air chamber R. Each of the two Helmholtz resonators Hd and He is set to have a silencing characteristic for a third-order resonance frequency to remove air column resonance noise at the third-order resonance frequency that is generated in the tire air chamber R. The first-order, second-order, and third-order resonance frequencies of the air column resonance noise in the tire air chamber R are determined by, for example, the length of the tire air chamber R in the wheel circumferential direction.

The two Helmholtz resonators Ha and Hb having the silencing characteristic for the second-order resonance frequency are adjacent to each other in the circumferential direction. The two Helmholtz resonators Hd and He having the silencing characteristic for the third-order resonance frequency are adjacent to each other in the circumferential direction. The two Helmholtz resonators Hc and Hf having the silencing characteristic for the first-order resonance frequency are not adjacent to each other in the circumferential direction (the two Helmholtz resonators Hd and He having the silencing characteristic for the third-order resonance frequency are interposed between the two Helmholtz resonators Hc and Hf).

The silencing characteristic of each Helmholtz resonator H is determined by, for example, the volume of the auxiliary air chamber 12, the opening diameter of the communication hole 14, and the length of the communication hole 14. At the same opening diameter and the same length of the communication hole 14, the volume of the auxiliary air chamber 12 of the Helmholtz resonator H having the silencing characteristic for the resonance frequency of the air column resonance noise generated in the tire air chamber R increases as the resonance frequency decreases.

As can be understood from FIG. 1, the wheel circumferential length of the auxiliary air chamber 12 of each of the two Helmholtz resonators Hc and Hf having the silencing characteristic for the first-order resonance frequency is larger than the wheel circumferential length of the auxiliary air chamber 12 of each of the two Helmholtz resonators Ha and Hb having the silencing characteristic for the second-order resonance frequency, and the wheel circumferential length of the auxiliary air chamber 12 of each of the two Helmholtz resonators Ha and Hb having the silencing characteristic for the second-order resonance frequency is larger than the wheel circumferential length of the auxiliary air chamber 12 of each of the two Helmholtz resonators Hd and He having the silencing characteristic for the third-order resonance frequency.

In the wheel 10 for the vehicle, the two Helmholtz resonators Hc and Hf remove the air column resonance noise at the first-order resonance frequency that is generated in the tire air chamber R, the two Helmholtz resonators Ha and Hb remove the air column resonance noise at the second-order resonance frequency that is generated in the tire air chamber R, and the two Helmholtz resonators Hd and He remove the air column resonance noise at the third-order resonance frequency that is generated in the tire air chamber R. As compared with the wheel for the vehicle described in WO 2015/137370 in which only the air column resonance noise at the first-order resonance frequency that is generated in the tire air chamber is removed, the silencing actions of the Helmholtz resonators Ha to Hf for the air column resonance noise in the tire air chamber R are increased at least by the amount corresponding to the removal of the air column resonance noise at the second-order and third-order resonance frequencies.

In the wheel 10 for the vehicle, the partition walls 13a to 13f are arrayed along the wheel circumferential direction to have line symmetry across a line segment L corresponding to the diameter and passing through a rotation axis O of the wheel 10 for the vehicle. A valve hole 15 for mounting a valve (not shown) for supplying air to the tire air chamber R is positioned on the line segment L in the wheel circumferential direction.

Therefore, the partition walls 13a to 13f having mass are arranged to have the line symmetry across the line segment L, and the valve having mass and mounted in the valve hole 15 is positioned on the line segment L in the wheel circumferential direction. As a result, a weight balance can be made uniform between a region on one side of the line segment L in the wheel circumferential direction (region above the line segment L in FIG. 1) and a region on the other side of the line segment L in the wheel circumferential direction (region below the line segment L in FIG. 1).

In the wheel 10 for the vehicle, the two Helmholtz resonators Hd and He having the silencing characteristic for the highest third-order resonance frequency are positioned to face the valve hole 15 across the rotation axis O in the wheel circumferential direction (right side of the rotation axis O in FIG. 1).

As the order of the resonance frequency of the air column resonance noise generated in the tire air chamber increases, the circumferential length of the Helmholtz resonator H having the silencing characteristic for the resonance frequency of the air column resonance noise decreases, and the circumferential distance between the two partition walls 13 defining the Helmholtz resonator H in the wheel circumferential direction decreases. When the two Helmholtz resonators Hd and He having the silencing characteristic for the highest third-order resonance frequency are positioned to face the valve hole 15 across the rotation axis O as described above, the region facing the valve hole 15 in the wheel circumferential direction (region on the right side of the rotation axis O in FIG. 1) includes more partition walls 13 having mass than in the region including the valve hole 15 in the wheel circumferential direction (region on the left side of the rotation axis O in FIG. 1). As a result, in the wheel 10 for the vehicle, the region facing the valve hole 15 in the wheel circumferential direction tends to be heavier than the region including the valve hole 15 in the wheel circumferential direction. In this respect, according to the structure described above, the valve having mass is arranged on the valve hole side in the wheel circumferential direction (=relatively light side) while being arranged in the valve hole (that is, in the use of the wheel for the vehicle). Thus, the weight balance between the region facing the valve hole 15 in the wheel circumferential direction and the region including the valve hole 15 in the wheel circumferential direction approaches a uniform balance.

In the wheel 10 for the vehicle, as shown in FIG. 1, an angle in the wheel circumferential direction between the communication holes 14 of the two Helmholtz resonators Hc and Hf having the silencing characteristic for the first-order resonance frequency is set to 90 degrees. An angle in the wheel circumferential direction between the communication holes 14 of the two Helmholtz resonators Ha and Hb having the silencing characteristic for the second-order resonance frequency is set to 45 degrees. An angle in the wheel circumferential direction between the communication holes 14 of the two Helmholtz resonators Hd and He having the silencing characteristic for the third-order resonance frequency is set to 30 degrees. Hereinafter, actions of this structure will be described.

In general, the waveform of the air column resonance noise generated in the tire air chamber of the wheel for the vehicle is a stationary wave that does not move in the wheel circumferential direction in the tire air chamber, and alternately has antinode positions and node positions in the wheel circumferential direction. Therefore, in a wheel for a vehicle including a Helmholtz resonator, the communication hole of the Helmholtz resonator alternately passes through the antinode positions and the node positions of the air column resonance noise as the wheel for the vehicle rotates. For this reason, a period in which the silencing effect of the Helmholtz resonator increases and a period in which the silencing effect decreases appear alternately, thereby causing variation in the silencing effect of the Helmholtz resonator. To suppress such variation in the silencing effect, there is known a method in which a plurality of Helmholtz resonators is arranged in the wheel circumferential direction and the arrangement of the communication holes of the Helmholtz resonators in the wheel circumferential direction is adjusted.

The inventors have found the following point regarding the arrangement of the communication holes of the Helmholtz resonators in the wheel circumferential direction. That is, it is assumed that the number of Helmholtz resonators having a silencing characteristic for an a-th order resonance frequency (a: natural number) of air column resonance noise is b (b: natural number equal to or larger than 2), one of b communication holes of the b Helmholtz resonators is a reference communication hole, (b−1) natural numbers c equal to or larger than 2 and equal to or smaller than b are assigned to (b−1) communication holes other than the reference communication hole in a one-to-one relationship, and n is any natural number. Then, an angle z (unit: degree) between the reference communication hole and each of the (b−1) communication holes other than the reference communication hole from the reference communication hole to one side in the wheel circumferential direction is a value expressed by Equation (1). In this case, it is possible to minimize variation in the silencing effect of the Helmholtz resonators for the air column resonance noise at the a-th order resonance frequency.

$$z = -180(c-1)/ab + 180n/a \quad (1)$$

Regarding the Helmholtz resonators having the silencing characteristic for the first-order (a=1) resonance frequency, z is 90 degrees when a is 1, b is 2, c is 2, and n is 1 in Equation (1). Therefore, regarding the communication holes 14 of the two Helmholtz resonators Hc and Hf having the silencing characteristic for the first-order resonance frequency in the wheel 10 for the vehicle shown in FIG. 1, when the communication hole 14 of the Helmholtz resonator Hc is defined as the reference communication hole, the angle z (=90 degrees) between the reference communication hole and the communication hole 14 of the Helmholtz resonator Hf from the reference communication hole in a counter-clockwise direction of the wheel circumferential direction is a value expressed by Equation (1). Thus, in the wheel 10 for the vehicle, it is possible to minimize the variation in the silencing effect of the two Helmholtz resonators Hc and Hf for the air column resonance noise at the first-order resonance frequency.

Regarding the Helmholtz resonators having the silencing characteristic for the second-order (a=2) resonance frequency, z is 45 degrees when a is 2, b is 2, c is 2, and n is 1 in Equation (1). Therefore, regarding the communication holes 14 of the two Helmholtz resonators Ha and Hb having the silencing characteristic for the second-order resonance frequency in the wheel 10 for the vehicle shown in FIG. 1, when the communication hole 14 of the Helmholtz resonator Ha is defined as the reference communication hole, the angle z (=45 degrees) between the reference communication hole and the communication hole 14 of the Helmholtz resonator Hb from the reference communication hole in the counter-clockwise direction of the wheel circumferential direction is a value expressed by Equation (1). Thus, in the wheel 10 for the vehicle, it is possible to minimize the variation in the silencing effect of the two Helmholtz resonators Ha and Hb for the air column resonance noise at the second-order resonance frequency.

Regarding the Helmholtz resonators having the silencing characteristic for the third-order (a=3) resonance frequency, z is 30 degrees when a is 3, b is 2, c is 2, and n is 1 in Equation (1). Therefore, regarding the communication holes 14 of the two Helmholtz resonators Hd and He having the silencing characteristic for the third-order resonance frequency in the wheel 10 for the vehicle shown in FIG. 1, when the communication hole 14 of the Helmholtz resonator Hd is defined as the reference communication hole, the angle z (=30 degrees) between the reference communication hole and the communication hole 14 of the Helmholtz resonator He from the reference communication hole in the counter-clockwise direction of the wheel circumferential direction is a value expressed by Equation (1). Thus, in the wheel 10 for the vehicle, it is possible to minimize the variation in the silencing effect of the two Helmholtz resonators Hd and He for the air column resonance noise at the third-order resonance frequency.

As described above, in the wheel 10 for the vehicle, it is possible to minimize the variation in the silencing effect not only for the air column resonance noise at the first-order resonance frequency but also for the air column resonance noise at the second-order and third-order resonance frequencies.

Actions and Effects

In the wheel 10 for the vehicle according to the embodiment of the present disclosure, the two Helmholtz resonators Hc and Hf remove the air column resonance noise at the first-order resonance frequency that is generated in the tire air chamber R. In addition, the two Helmholtz resonators Ha and Hb can remove the air column resonance noise at the second-order resonance frequency that is generated in the tire air chamber R, and the two Helmholtz resonators Hd and He can remove the air column resonance noise at the third-order resonance frequency that is generated in the tire air chamber R. As compared with the wheel for the vehicle described in WO 2015/137370, the silencing actions of the Helmholtz resonators Ha to Hf for the air column resonance noise in the tire air chamber R are increased at least by the amount corresponding to the removal of the air column resonance noise at the second-order and third-order resonance frequencies.

The present disclosure is not limited to the representative embodiment described above, and various applications and modifications are conceivable without departing from the object of the present disclosure. For example, the following embodiments may be implemented by applying the embodiment described above.

Figure 2:
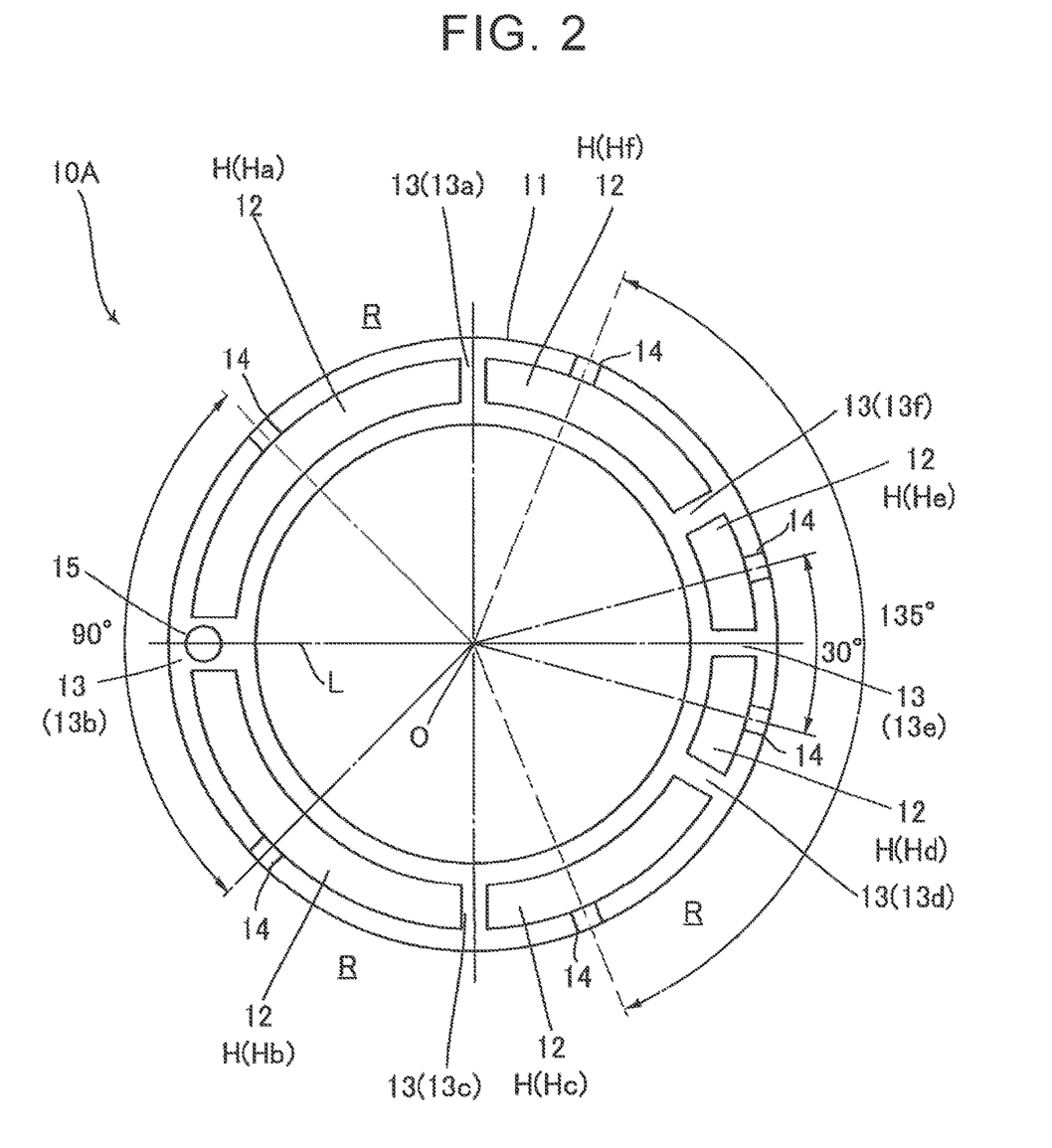
FIG. 2 is a sectional view schematically showing a wheel for a vehicle according to a modification.

In the wheel 10 for the vehicle according to the embodiment shown in FIG. 1, the two Helmholtz resonators Ha and Hb having the silencing characteristic for the second-order resonance frequency are adjacent to each other in the circumferential direction, and the two Helmholtz resonators Hd and He having the silencing characteristic for the third-order resonance frequency are adjacent to each other in the circumferential direction. The two Helmholtz resonators Hc and Hf having the silencing characteristic for the first-order resonance frequency are not adjacent to each other in the circumferential direction (the two Helmholtz resonators Hd and He having the silencing characteristic for the third-order resonance frequency are interposed between the two Helmholtz resonators Hc and Hf). A wheel 10A for the vehicle according to a modification shown in FIG. 2 may be adopted. In FIG. 2, components identical or equivalent to those shown in FIG. 1 are represented by the same reference symbols as those shown in FIG. 1 to omit the description of those components.

The wheel 10A for the vehicle shown in FIG. 2 differs from the wheel 10 for the vehicle in that two Helmholtz resonators Ha and Hb having a silencing characteristic for the first-order resonance frequency are adjacent to each other in the circumferential direction, two Helmholtz resonators Hd and He having a silencing characteristic for the third-order resonance frequency are adjacent to each other in the circumferential direction, and two Helmholtz resonators Hc and Hf having a silencing characteristic for the second-order resonance frequency are not adjacent to each other in the circumferential direction (the two Helmholtz resonators Hd and He having the silencing characteristic for the third-order resonance frequency are interposed between the two Helmholtz resonators Hc and Hf).

The wheel 10A for the vehicle shown in FIG. 2 is similar to the wheel 10 for the vehicle in that the partition walls 13a to 13f are arrayed along the wheel circumferential direction to have the line symmetry across the line segment L corresponding to the diameter and passing through the rotation axis O of the wheel 10A for the vehicle and the valve hole 15 for mounting the valve (not shown) for supplying air to the tire air chamber R is positioned on the line segment L in the wheel circumferential direction. Therefore, in the wheel 10A for the vehicle, similarly to the wheel 10 for the vehicle, a weight balance can be made uniform between a region on one side of the line segment L in the wheel circumferential direction (region above the line segment L in FIG. 2) and a region on the other side of the line segment L in the wheel circumferential direction (region below the line segment L in FIG. 2).

The wheel 10A for the vehicle shown in FIG. 2 is similar to the wheel 10 for the vehicle in that the two Helmholtz resonators Hd and He having the silencing characteristic for the highest third-order resonance frequency are positioned to face the valve hole 15 across the rotation axis O in the wheel circumferential direction (right side of the rotation axis O in FIG. 2). Therefore, in the wheel 10A for the vehicle, similarly to the wheel 10 for the vehicle, the valve having mass is arranged on the valve hole side in the wheel circumferential direction (=relatively light side) while being arranged in the valve hole (that is, in the use of the wheel for the vehicle). Thus, the weight balance between the region facing the valve hole 15 in the wheel circumferential direction and the region including the valve hole 15 in the wheel circumferential direction approaches a uniform balance.

In the wheel 10A for the vehicle shown in FIG. 2, an angle in the wheel circumferential direction between the communication holes 14 of the two Helmholtz resonators Ha and Hb having the silencing characteristic for the first-order resonance frequency is set to 90 degrees. An angle in the wheel circumferential direction between the communication holes 14 of the two Helmholtz resonators Hc and Hf having the silencing characteristic for the second-order resonance frequency is set to 135 degrees. An angle in the wheel circumferential direction between the communication holes 14 of the two Helmholtz resonators Hd and He having the silencing characteristic for the third-order resonance frequency is set to 30 degrees.

Regarding the Helmholtz resonators having the silencing characteristic for the first-order (a=1) resonance frequency, z is 90 degrees when a is 1, b is 2, c is 2, and n is 1 in Equation (1). Therefore, regarding the communication holes 14 of the two Helmholtz resonators Ha and Hb having the silencing characteristic for the first-order resonance frequency in the wheel 10A for the vehicle shown in FIG. 2, when the communication hole 14 of the Helmholtz resonator Ha is defined as the reference communication hole, the angle z (=90 degrees) between the reference communication hole and the communication hole 14 of the Helmholtz resonator Hb from the reference communication hole in the counterclockwise direction of the wheel circumferential direction is a value expressed by Equation (1). Thus, in the wheel 10A for the vehicle, it is possible to minimize the variation in the silencing effect of the two Helmholtz resonators Ha and Hb for the air column resonance noise at the first-order resonance frequency.

Regarding the Helmholtz resonators having the silencing characteristic for the second-order (a=2) resonance frequency, z is 135 degrees when a is 2, b is 2, c is 2, and n is 2 in Equation (1). Therefore, regarding the communication holes 14 of the two Helmholtz resonators Hc and Hf having the silencing characteristic for the second-order resonance frequency in the wheel 10A for the vehicle shown in FIG. 2, when the communication hole 14 of the Helmholtz resonator Hc is defined as the reference communication hole, the angle z (=135 degrees) between the reference communication hole and the communication hole 14 of the Helmholtz resonator Hf from the reference communication hole in the counterclockwise direction of the wheel circumferential direction is a value expressed by Equation (1). Thus, in the wheel 10A for the vehicle, it is possible to minimize the variation in the silencing effect of the two Helmholtz resonators Hc and Hf for the air column resonance noise at the second-order resonance frequency.

Regarding the Helmholtz resonators having the silencing characteristic for the third-order (a=3) resonance frequency, z is 30 degrees when a is 3, b is 2, c is 2, and n is 1 in Equation (1). Therefore, regarding the communication holes 14 of the two Helmholtz resonators Hd and He having the silencing characteristic for the third-order resonance frequency in the wheel 10A for the vehicle shown in FIG. 2, when the communication hole 14 of the Helmholtz resonator Hd is defined as the reference communication hole, the angle z (=30 degrees) between the reference communication hole and the communication hole 14 of the Helmholtz resonator He from the reference communication hole in the counterclockwise direction of the wheel circumferential direction is a value expressed by Equation (1). Thus, in the wheel 10A for the vehicle, it is possible to minimize the variation in the silencing effect of the two Helmholtz resonators Hd and He for the air column resonance noise at the third-order resonance frequency.

As described above, in the wheel 10A for the vehicle, similarly to the wheel 10 for the vehicle, it is possible to minimize the variation in the silencing effect not only for the air column resonance noise at the first-order resonance frequency but also for the air column resonance noise at the second-order and third-order resonance frequencies.

Figure 3:
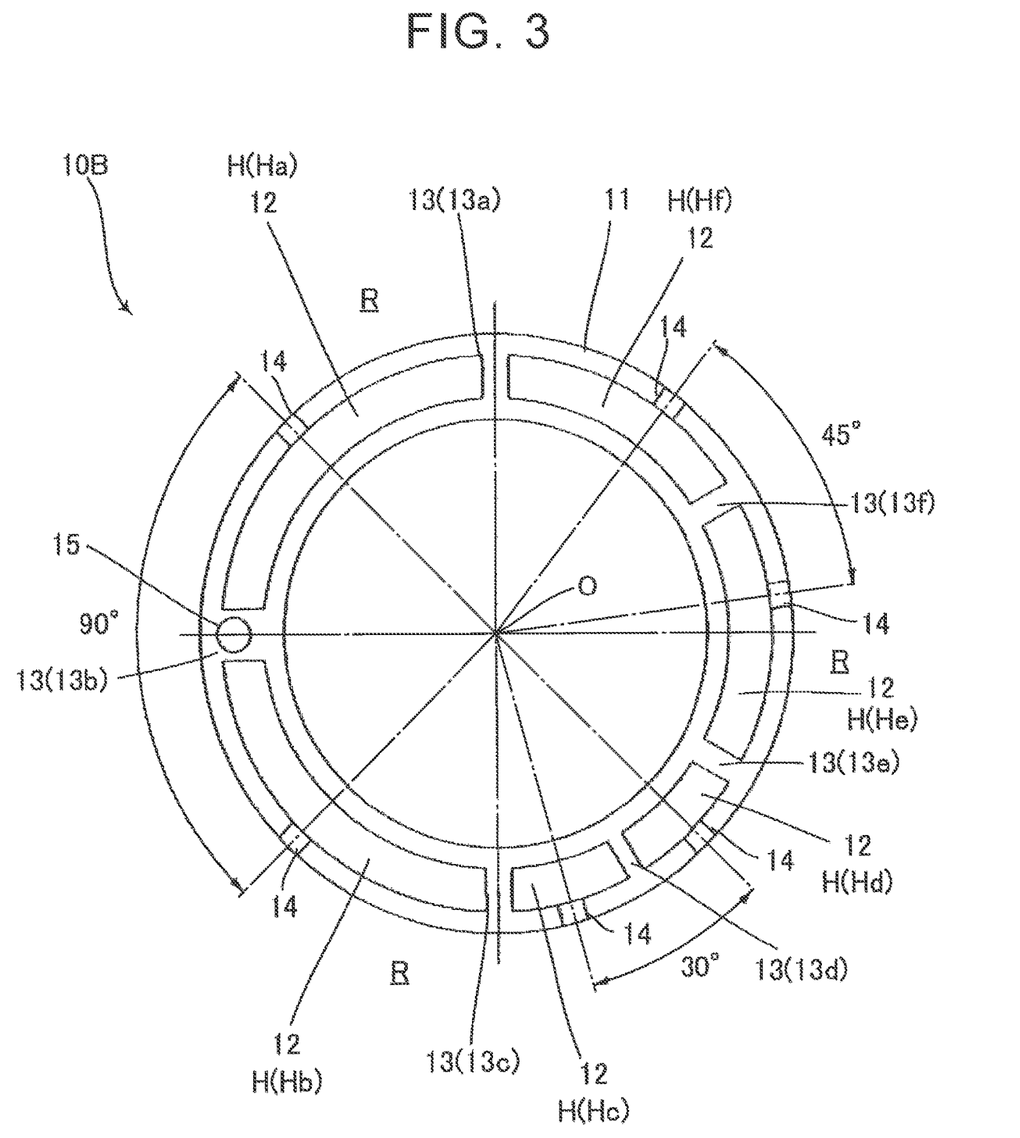
FIG. 3 is a sectional view schematically showing a wheel for a vehicle according to another modification.

A wheel 10B for the vehicle according to a modification shown in FIG. 3 may further be adopted. In FIG. 3, components identical or equivalent to those shown in FIG. 1 are represented by the same reference symbols as those shown in FIG. 1 to omit the description of those components.

The wheel 10B for the vehicle shown in FIG. 3 differs from the wheel 10 for the vehicle in that two Helmholtz resonators Ha and Hb having a silencing characteristic for the first-order resonance frequency are adjacent to each other in the circumferential direction, two Helmholtz resonators He and Hf having a silencing characteristic for the second-order resonance frequency are adjacent to each other in the circumferential direction, and two Helmholtz resonators Hc and Hd having a silencing characteristic for the third-order resonance frequency are adjacent to each other in the circumferential direction.

In the wheel 10B for the vehicle shown in FIG. 3, an angle in the wheel circumferential direction between the communication holes 14 of the two Helmholtz resonators Ha and Hb having the silencing characteristic for the first-order resonance frequency is set to 90 degrees. An angle in the wheel circumferential direction between the communication holes 14 of the two Helmholtz resonators He and Hf having the silencing characteristic for the second-order resonance frequency is set to 45 degrees. An angle in the wheel circumferential direction between the communication holes 14 of the two Helmholtz resonators Hc and Hd having the silencing characteristic for the third-order resonance frequency is set to 30 degrees.

Regarding the Helmholtz resonators having the silencing characteristic for the first-order ($a=1$) resonance frequency, $z$ is 90 degrees when $a$ is 1, $b$ is 2, $c$ is 2, and $n$ is 1 in Equation (1). Therefore, regarding the communication holes 14 of the two Helmholtz resonators Ha and Hb having the silencing characteristic for the first-order resonance frequency in the wheel 10B for the vehicle shown in FIG. 3, when the communication hole 14 of the Helmholtz resonator Ha is defined as the reference communication hole, the angle $z$ (=90 degrees) between the reference communication hole and the communication hole 14 of the Helmholtz resonator Hb from the reference communication hole in the counterclockwise direction of the wheel circumferential direction is a value expressed by Equation (1). Thus, in the wheel 10B for the vehicle, it is possible to minimize the variation in the silencing effect of the two Helmholtz resonators Ha and Hb for the air column resonance noise at the first-order resonance frequency.

Regarding the Helmholtz resonators having the silencing characteristic for the second-order ($a=2$) resonance frequency, $z$ is 45 degrees when $a$ is 2, $b$ is 2, $c$ is 2, and $n$ is 1 in Equation (1). Therefore, regarding the communication holes 14 of the two Helmholtz resonators He and Hf having the silencing characteristic for the second-order resonance frequency in the wheel 10B for the vehicle shown in FIG. 3, when the communication hole 14 of the Helmholtz resonator He is defined as the reference communication hole, the angle $z$ (=45 degrees) between the reference communication hole and the communication hole 14 of the Helmholtz resonator Hf from the reference communication hole in the counterclockwise direction of the wheel circumferential direction is a value expressed by Equation (1). Thus, in the wheel 10B for the vehicle, it is possible to minimize the variation in the silencing effect of the two Helmholtz resonators He and Hf for the air column resonance noise at the second-order resonance frequency.

Regarding the Helmholtz resonators having the silencing characteristic for the third-order ($a=3$) resonance frequency, $z$ is 30 degrees when $a$ is 3, $b$ is 2, $c$ is 2, and $n$ is 1 in Equation (1). Therefore, regarding the communication holes 14 of the two Helmholtz resonators Hc and Hd having the silencing characteristic for the third-order resonance frequency in the wheel 10B for the vehicle shown in FIG. 3, when the communication hole 14 of the Helmholtz resonator Hc is defined as the reference communication hole, the angle $z$ (=30 degrees) between the reference communication hole and the communication hole 14 of the Helmholtz resonator Hd from the reference communication hole in the counterclockwise direction of the wheel circumferential direction is a value expressed by Equation (1). Thus, in the wheel 10B for the vehicle, it is possible to minimize the variation in the silencing effect of the two Helmholtz resonators Hc and Hd for the air column resonance noise at the third-order resonance frequency.

As described above, in the wheel 10B for the vehicle, similarly to the wheel 10 for the vehicle, it is possible to minimize the variation in the silencing effect not only for the air column resonance noise at the first-order resonance frequency but also for the air column resonance noise at the second-order and third-order resonance frequencies.

In the embodiment shown in FIG. 1 and the modifications shown in FIGS. 2 and 3, the two Helmholtz resonators H are provided as the Helmholtz resonator H set to have the silencing characteristic for the first-order resonance frequency of the air column resonance noise in the tire air chamber R. There may be provided three or more Helmholtz resonators H or a single Helmholtz resonator H set to have the silencing characteristic for the first-order resonance frequency of the air column resonance noise in the tire air chamber R.

In the embodiment shown in FIG. 1 and the modifications shown in FIGS. 2 and 3, the two Helmholtz resonators H are provided as the Helmholtz resonator H set to have the silencing characteristic for the second-order resonance frequency of the air column resonance noise in the tire air chamber R. There may be provided three or more Helmholtz resonators H or a single Helmholtz resonator H set to have the silencing characteristic for the second-order resonance frequency of the air column resonance noise in the tire air chamber R. Further, the Helmholtz resonators H set in this way may be omitted.

In the embodiment shown in FIG. 1 and the modifications shown in FIGS. 2 and 3, the two Helmholtz resonators H are provided as the Helmholtz resonator H set to have the silencing characteristic for the third-order resonance frequency of the air column resonance noise in the tire air chamber R. There may be provided three or more Helmholtz resonators H or a single Helmholtz resonator H set to have the silencing characteristic for the third-order resonance frequency of the air column resonance noise in the tire air chamber R. Further, the Helmholtz resonators H set in this way may be omitted.

In the embodiment shown in FIG. 1 and the modifications shown in FIGS. 2 and 3, the Helmholtz resonators Ha to Hf are integrated in the wheel rim 11. For example, the wheel for the vehicle according to the disclosure may be realized by fixing a plurality of resin Helmholtz resonators (auxiliary air chamber members) to the wheel rim 11.

In this case, the resin Helmholtz resonators may be arrayed along the wheel circumferential direction (without overlapping each other in the wheel circumferential direction) at different positions in the wheel circumferential direction, or may be arrayed along a wheel axial direction and overlap each other in the wheel circumferential direction.

What is claimed is:

1. A wheel for a vehicle, comprising:
a plurality of Helmholtz resonators, each including an auxiliary air chamber communicating with a tire air chamber through a communication hole, wherein:
the Helmholtz resonators include one or more first Helmholtz resonators set to have a silencing characteristic for a first-order resonance frequency of air column resonance noise in the tire air chamber, and one or more second Helmholtz resonators set to have a silencing characteristic for a second-order or higher-order resonance frequency of the air column resonance noise,
when a number of the Helmholtz resonators having a silencing characteristic for an a-th order resonance frequency of the air column resonance noise is b, one of the b communication holes of the b Helmholtz resonators is a reference communication hole, natural numbers c equal to or larger than 2 and equal to or smaller than b are assigned to the communication holes other than the reference communication hole in a one-to-one relationship, and n is a natural number,
an angle z between the reference communication hole and each of the communication holes other than the reference communication hole from the reference communication hole to one side in a circumferential direction of the wheel is a value expressed by z=−180(c−1)/ab+180n/a, and
the auxiliary air chambers of the plurality of Helmholtz resonators are each arrayed along a circumferential direction of the wheel without overlapping each other in the circumferential direction.

2. The wheel according to claim 1, wherein:
the Helmholtz resonators are arrayed along a circumferential direction of the wheel at different positions in the circumferential direction of the wheel;
a length of the auxiliary air chamber of the second Helmholtz resonator in the circumferential direction of the wheel is set smaller than a length of the auxiliary air chamber of the first Helmholtz resonator in the circumferential direction of the wheel;
a plurality of partition walls that separates the Helmholtz resonators in the circumferential direction of the wheel is arrayed along the circumferential direction of the wheel to have line symmetry across a line segment corresponding to a diameter and passing through a rotation axis of the wheel; and
a valve hole for mounting a valve configured to supply air to the tire air chamber is positioned on the line segment in the circumferential direction of the wheel.

3. The wheel according to claim 2, wherein
at least one of the one or more second Helmholtz resonators is set to have a silencing characteristic for a resonance frequency equal to a highest-order resonance frequency and positioned to face the valve hole across the rotation axis in the circumferential direction of the wheel.

4. The wheel according to claim 1, wherein:
regarding the one or more first Helmholtz resonators set to have the silencing characteristic for the first-order (a=1) resonance frequency of the air column resonance noise, when a number of the one or more first Helmholtz resonators is two (b=2), and n=1,
the angle between the communication holes of the two first Helmholtz resonators is 90°.

5. The wheel according to claim 1, wherein:
among the one or more second Helmholtz resonators, when there are two (b=2) second-order Helmholtz resonators that are set to have the silencing characteristic for the second-order (a=2) resonance frequency of the air column resonance noise, and n=1,
the angle between the communication holes of the two second-order Helmholtz resonators is 45°.

6. The wheel according to claim 1, wherein:
among the one or more second Helmholtz resonators, when there are two (b=2) third-order Helmholtz resonators that are set to have a silencing characteristic for a third-order (a=3) resonance frequency of the air column resonance noise, and n=1,
the angle between the communication holes of the two third-order Helmholtz resonators is 30°.

7. The wheel according to claim 1, wherein:
among the one or more second Helmholtz resonators, Helmholtz resonators that are set to have a silencing characteristic for a same-order resonance frequency of the air column resonance noise are arranged to be adjacent to each other along a circumferential direction of the wheel; and
one or more first Helmholtz resonators are arranged to be not adjacent to each other along the circumferential direction of the wheel.

* * * * *